United States Patent Office 3,508,142
Patented Apr. 21, 1970

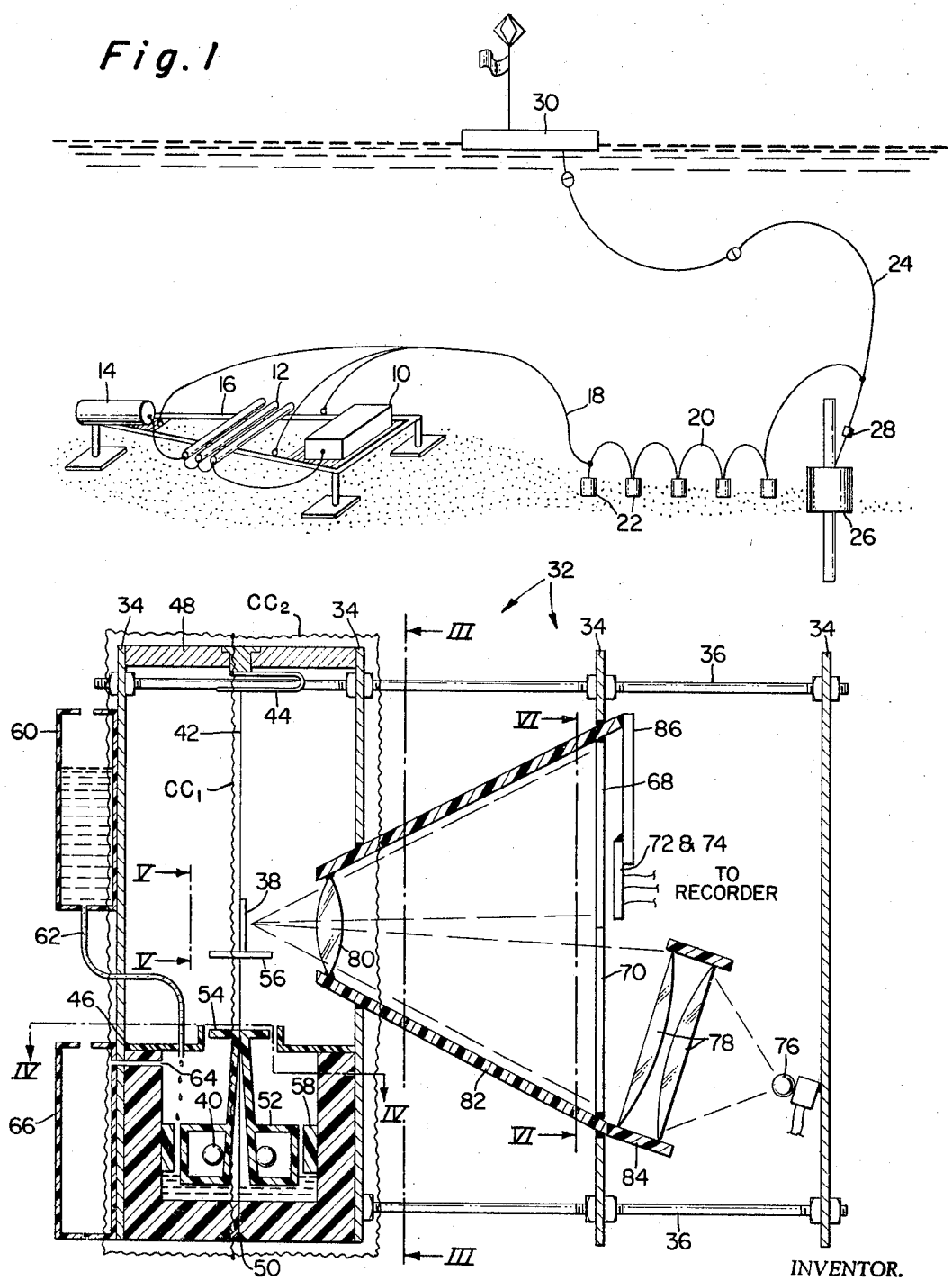

3,508,142
MAGNETOMETER UTILIZING A MIRROR AND A MAGNET, THE LATTER BEING MOVABLE RELATIVE TO SAID MIRROR TO A CONNECT AND DISCONNECT POSITION
Jean H. Filloux, La Jolla, Calif., assignor, by mesne assignments, to the United States of America as represented by the Secretary of the Navy
Filed June 17, 1968, Ser. No. 737,718
Int. Cl. G01r 33/02
U.S. Cl. 324—48                    13 Claims

ABSTRACT OF THE DISCLOSURE

The description discloses a magnetometer for measuring the earth's magnetic fluctuations. The magnetometer may include a taut wire which is connected between the bottom of an open container to a top support means; a mirror mounted on the wire; a float located in the container and mounted for movement along and about the wire; a magnet mounted on the float; and means for filling the container with a liquid to raise the float to engage the mirror. A means may be provided for sensing the movement of the mirror, which movement will correspond to magnetic fluctuations imposed upon the magnet.

The invention described herein may be manufactured and used by or for the Government of the United States of America for governmental purposes without the payment of any royalties thereon or therefor.

In discerning the extent of magnetic material within the earth's crust geophysicists have employed what is known as the magnetotelluric probing method. This method consists of recording and interpreting the electric and magnetic fluctuations at the earth's surface, which are caused by the penetration of the earth's surface of long electromagnetic waves generated in the ionosphere. When the incident fields are adequately uniform the magnetotelluric ratio $E/H_N$, measured over an area of horizontally stratified earth, leads to knowledge of the electric conductivity distribution with depth, where E is an horizontal electric field component and $H_N$ is the horizontal magnetic fluctuation normal thereto.

The magnetotelluric method is relatively easy to apply on land. It is, however, far more difficult to apply such method at sea, since it is necessary to obtain, simultaneously and at the same place, two types of information which are individually hard to get, namely the electric field component and the horizontal magnetic fluctuation. The electric field may be measured by a bottom located voltmeter and the horizontal magnetic fluctuation may be measured by a bottom located magnetometer. The present invention provides a simply constructed, self-contained, single component magnetometer which is sensitive to magnetic fluctuations in east and west directions only. The east-west component is generally called D, hence the name D component magnetometer may be employed in naming the present invention. In recording only D, in contrast to that recorded by a three-component magnetometer, the construction of the magnetometer is greatly simplified by utilizing a sensing magnet which is allowed to orient itself freely in the magnetic north-south direction.

The present invention provides a very simple D component magnetometer by including a mirror; means supporting the mirror for rotation about an axis; a magnet; means supporting the magnet for movement about and along the axis between connected and disconnected positions with respect to the mirror; and means for connecting the magnet to the mirror so that the mirror will rotate in response to rotations of the magnet about said axis. A means may be provided for sensing the rotative movements of the mirror upon the connection of the magnet to the mirror, thereby providing an indication of horizontal magnetic fluctuations at the ocean bottom of the earth's surface. By utilizing a float to support the magnet and utilizing a fluid to raise the float to connect the magnet to the mirror the present magnetometer is specially adapted for indicating horizontal magnetic fluctuations at the ocean bottom where human manipulative control is impractical or impossible to attain.

An object of the present invention is to provide a simply constructed D component magnetometer.

Another object is to provide a magnetometer which can be utilized without human manipulative control to indicate horizontal magnetic fluctuations at the ocean bottom.

Other objects, advantages and novel features of the invention will become apparent from the following detailed description of the invention when considered in conjunction with the accompanying drawings wherein:

FIG. 1 is a isometric view of the magnetometer, batteries, recorder, anchors, and surface located float;

FIG. 2 is a vertical cross sectional view through the present magnetometer;

Figure 3:
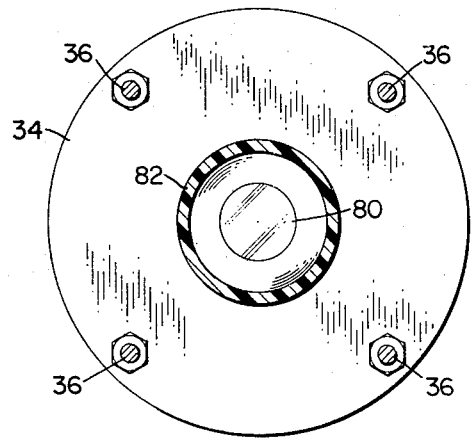
FIG. 3 is a view taken along plane III–III of FIG. 2.

Referring now to the drawings wherein like reference numerals designate like or similar parts throughout the several views, there is shown in FIG. 1 an ocean bottom environment in which the magnetometer, to be described in detail hereinafter, is intended to operate. The magnetometer is mounted in a pressure case (not shown) which in turn is mounted on gimbals (not shown) within a housing 10. The housing 10, a series of battery packs 12, and a recorder 14 are mounted on an A frame 16 which is shown resting on the ocean bottom. The magnetometer within the housing 10, the battery packs 12 and the recorder 14 are electrically connected by wires so that the batteries 12 supply power to the magnetometer and the recorder 14 and the magnetometer 14 records indications provided by the magnetometer. There may be connected to the A frame 16 a line 18 which is in turn connected to a buoyant line 20. Buoyant line 20 is connected to a series of weights 22 as well as to a mooring line 24. The mooring line 24 is connected at its bottom end to an anchor 26 which has a short line with a quick release device 28 and is connected at its top end to a surface float 30. Accordingly, when the A frame 16 and the instrumentation mounted between is to be raised the mooring line 24 is pulled up by a winch (not shown) whereupon the quick release 28 disconnects the mooring line from the anchor 26 and the A frame 16 and the equipment mounted thereon are then raised.

The magnetometer 32 exclusive of the pressure case (not shown) and the housing 10, is shown in FIG. 2. The components of the magnetometer are held in a cooperative relationship with one another by a frame which may include a series of circular plates 34 which are held in a spaced relationship by threaded shafts 36 and nuts. The magnetometer generally includes a mirror 38; means, to be described in detail hereinafter, supporting the mirror 38 for rotation about a vertical axis; a magnet or magnets 40; means, to be described in detail hereinafter, supporting the magnets 40 for movement about and along the vertical axis between connected and disconnected positions with respect to the mirror 38; and means, to be described in detail hereinafter, for connecting the magnets 40 to the mirror 38 so that the mirror will rotate in response to rotations of the magnets 40 about the vertical axis.

The supporting means for the mirror 38 and the magnets 40 may include a taut wire 42 and means, to be described in detail hereinafter, mounting the magnets 40 to the wire 42 for movement along and about the wire. The wire 42, which may be constructed of tungsten and approximately .07 mm. in diameter, may be connected at its top end to a U-shaped spring 44 and may be connected at its bottom end to the bottom of a container 46. The spring 44 may be connected to a crossbar 48 which extends between and is connected to a pair of the plates 34 and the bottom end of the wire 42 may sealably extend through a small aperture in the bottom of the container 46 and may be prevented from slippage therethrough by an end plug 50. The spring 44 will maintain the wire 42 in a taut condition. The back side of the mirror 38 may be bonded by an epoxy to the wire 42 so that the optical axis of the mirror is aligned along a horizontal. The means for mounting the magnets 40 to the wire 42 may include an annular float 52 which has a central aperture through which the wire extends so that the float may slidably move along and about the wire. The magnets 40, which may be small bars constructed of Alnico, may be bonded by an epoxy to inner surfaces of the float 52 so that the magnets are aligned in horizontal positions.

It is desirable that the magnets 40 be connectable with the mirror 38 so that movement of the magnets 40 due to magnetic fluctuations will be transmitted to cause corresponding movements of the mirror 38. This has been accomplished by providing the container 46 with an open top through which the float 52 may extend and be connected with the mirror 38. The top of the float 52 may be provided with an upstanding portion which has mounted at its top a disc 54 which is oriented in a substantially perpendicular position with respect to the wire 42. Mounted at the bottom of the mirror 38 may be another disc 56 which is also oriented in a substantially perpendicular position with respect to the wire 42. Accordingly, when the float 52 is raised sufficiently the discs 54 and 56 will engage one another to connect the magnets 40 to the mirror 38 so that the movements of the magnets are transmitted to the mirror 38. An annular bumper 58 may be bonded to the interior surface of the container 46 in close proximity to the float 52 for the purpose of guiding the float's upward movement.

Figure 4:
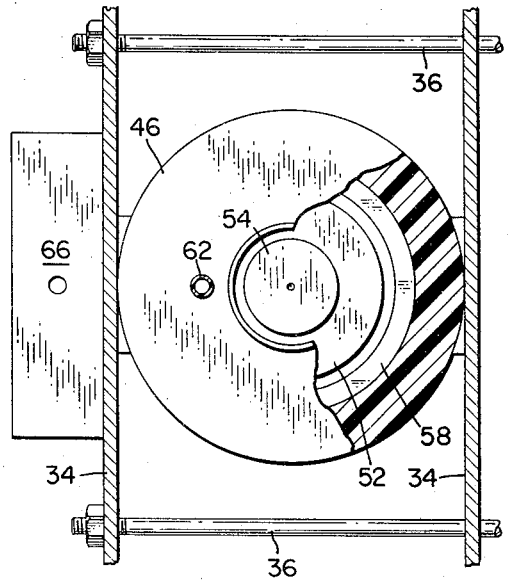
FIG. 4 is a view taken along plane IV–IV of FIG. 2.
Figure 5:
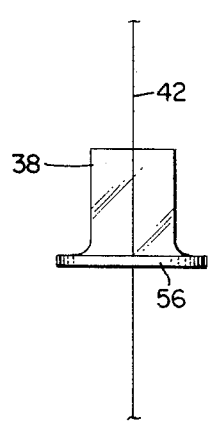
FIG. 5 is a view taken along plane V–V of FIG. 2.

The means for connecting the magnets 40 to the mirror 38 may include the container 46, the float 52 being located within the container, and the mounting of the magnets 40 to the float 52. The container 46 may be mounted between a pair of the plates 34 and may be connected thereto by any suitable means, such as epoxy bonding (see FIG. 4). The means for connecting the magnet to the mirror may further include means for filling the container to the mirror may further include means for filling the container with a liquid so as to buoy the float 52 upward along the wire 42 or vertical axis. The filling means may include a tank 60 which is mounted to one of the circular plates 34 above the container 46 with a small fluid line which is connected between the bottom of the tank 60 and the top of the container 46. The tank 60 is filled with a liquid, such as oil, to empty into the container 46 to buoy the float 52 upwardly a sufficient extent to cause driving frictional engagement between the discs 54 and 56. The size of the fluid line 62 is chosen to cause a desired rate of filling of the tank 46. An opening 64 may be provided in the side of the tank 46 for the purpose of emptying the oil into an overflow tank 66 which may be also mounted to one of the circular plates 34. The height of the opening 64 may also be chosen so as to cause driving frictional engagement between the discs 54 and 56. It should be noted that the means for connecting the magnets 40 to the mirror 38 may further include the taut wire 42 and the mounting of the float 52 for slidable movement along and about such wire.

Figure 6:
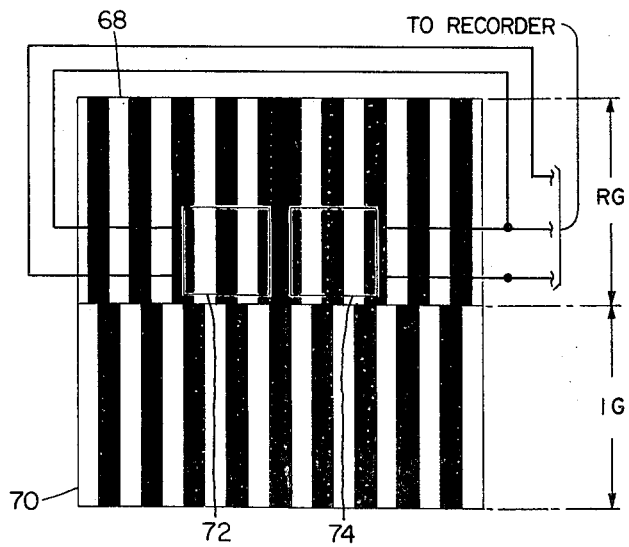
FIG. 6 is a view taken along plane VI–VI of FIG. 2.

The magnetometer 32 may further include means for sensing the rotative movements of the mirror 38 about the axis of the wire 42. The sensing means includes a pair of adjacent grids 68 and 70 which are mounted on opposite sides, top and bottom, of the optical axis of the mirror 38; the grid 70 being an incident grid and the grid 68 being a reflected grid, and both grids, which may be constructed of glass, having alternate transparent and opaque parallel bands which may be offset with respect to one another as shown in FIG. 6; means, to be described in detail hereinafter, for directing light through the incident grid 70 to the mirror 38, thence to the reflected grid 68 so that movements of the mirror 38 impose the grid pattern of the incident grid 70 at corresponding positions on the reflected grid 68; and further including means, which may include a pair of photocells 72 and 74, for sensing the amount of light passed through the reflected grid 68.

The light for the sensing means may be provided by a small light bulb 76 which may be mounted, as shown in FIG. 2, to the right plate 34. The means for directing this light through the incident grid 70 may include collector lenses 78; the means for directing the light passed through the incident grid 70 to the mirror 38 may include an objective lens 80, which may be mounted with its optical axis aligned with the optical axis of the mirror 38 when the mirror is located in a center unbiased wire position; and the objective lens 80 may also direct the reflected light from the mirror 38 to the reflected grid 68. The grids 68 and 70, and the objective lens 80 may be held in their relative positions by bonding these components respectively to the interior surface of a hollow frusto-conical light shield 82. As shown in FIG. 2, the light shield 82 may extend through a central aperture within one of the intermediate plates 34 and may be mounted at an opposite end, by any suitable means such as bonding, within a large central opening within the other intermediate plate 34. A ring 84 may be mounted at the lower end of the light shield 82 for mounting the collector lenses 78, and the photocells 72 and 74 may be supported in position behind the reflected grid 68 by support arms 86, one of these support arms being shown in FIG. 2.

The grids 68 and 80 have alternate opaque and transparent parallel bands of exactly the same width with the execption of the reflected grid 68 which has a center opaque band which is twice the width of the other opaque or transparent bands. As shown in FIG. 6 the photocells 72 and 74 are located one on each side of the central axis of the middle enlarged opaque band of the reflected grid 68. The cells 72 and 74, which may be silicone solar cells, are connected by leads, as shown in FIG. 6, to circuitry which will be described in detail hereinafter. The grids 68 and 70, which have been called an optical lever, have been described conceptionally in my application Ser. No. 589,298 entitled "Detecting and Measuring Device and System Therefor."

In the operation of the optical lens the light reflected from the mirror 38, after crossing the objective lens 80, forms an image of the incident grid 70 in the plane of the reflected grid 68. If the normal to the mirror 38 coincides exactly with the axis of the optical lever (grids 68 and 70), the same mismatch between the image and reflected grid 68 will occur on both halves of the reflected gril. Otherwise stated, a balanced state with equal amount of light transmitted through both sides of the reflected grid 68 exists with proper alignment with the mirror 38. However, if the mirror 38 rotates slightly, the mismatch will increase on one side of the reflected grid 68 while decreasing on the other side thereof. Any departure from the centered position causes a light unbalance of one side compared to the other side. This unbalance, which is proportional to the rotation of the mirror 38, is picked up by the two light sensors 72 anl 74. When full light unbalance has been reached, further mirror rotation repeats the cycle of the grid and grid image relationship at the reflected grid 68 with an inverted sign until a new maximum unbalance has been reached. With further rotation of the mirror 38 a new cycle is commenced with the original slope and so on to the maximum limits of the optical lever. This repetitive feature is illustrated in graphic form in FIG. 9 where mirror reflection is plotted versus the readings obtained from the light cells 72 and 74. It should be noted that at maximum mirror deflection the output from the cells 72 anl 74 are slightly rounded, as shown by the dotted lines in FIG. 9, due to the inability in the present state of the art to obtain an exact edge between the opaque and transparent bands of the grids 68 and 70.

The repetitive feature of the optical lens, as described hereinabove, allows the sensitivity thereof to remain constant over a large range of mirror rotation and makes the adjustment of the instrument uncritical because the mirror 38 does not have to be perfectly centered in order to insure successful operation. In particular, it makes allowance for possible misalignment of the mirror 38 due to large shocks during the handling thereof. Furthermore, by choosing a sensitivity high enough to resolve small field fluctuations the occasional and unpredictable large signals associated with magnetic storms are not lost. It would only be necessary to match the width of a recorder chart, to be described hereinafter, to the photocell output between the extreme unbalance points.

Figure 9:
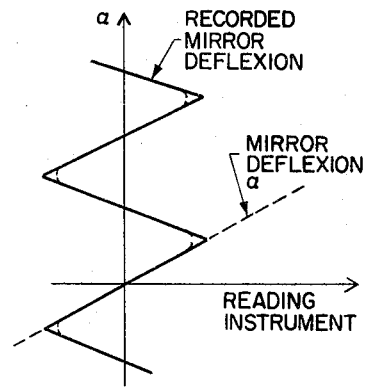
FIG. 9 is a graph illustration of the relationship of magnetometer readings to mirror rotation.

As stated hereinabove, the relation of instrument readings to mirror rotation (magnetic field fluctuations) curve, as shown in FIG. 9, will not under practical conditions display a sharp slope reversal but instead will be rounded out in the reversal areas as shown by the small dotted curves. This lack of linearity will cause erroneous readings and has been overcome in the present invention by employing two calibration coils $CC_1$ and $CC_2$, as shown in FIG. 2, which are disposed at right angles with respect to one another about the pair of magnets 40. The calibration coil $CC_1$ may be in a plane which is parallel to the axes of the magnets 40 and the calibration coil $CC_2$ may be in a plane which is perpendicular thereto. By appropriately energizing these coils at selected times secondary traces may be imposed upon a recorder for comparison with the primary trace due to actual magnetic field fluctuations. The slope of the traces due to energization of the calibration coils can be then used for correcting the erroneous slope of the magnet field fluctuation trace in the area of the reversal, shown in FIG. 9.

Figure 10:
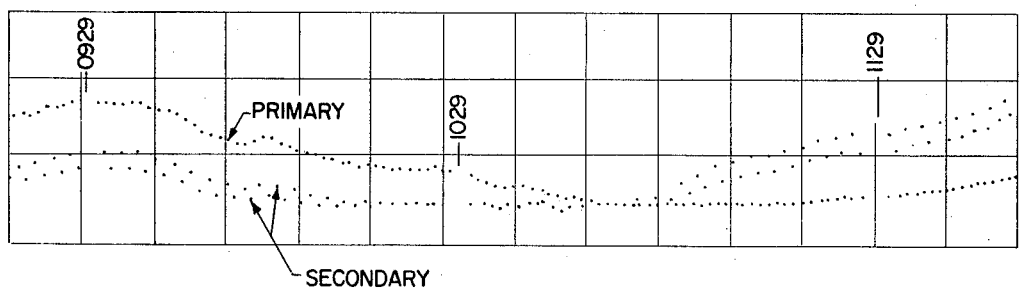
FIG. 10 is a graphic illustration of recordings obtained by the present magnetometer.

As shown in FIG. 10, the secondary traces may be two sparsely dotted lines on a chart while the primary trace may be twice as dense. The circuitry for causing this result will be described in detail hereinafter. The magnitudes of the incremental fields, caused by the calibration coils $CC_1$ and $CC_2$, are chosen so that, regardless of the magnetometer orientation, at least one of the coils will bring the reading within a linear area of the response curve. When reading the chart of FIG. 10, the interpreter will utilize the calibration traces when necessary to correct the primary trace. When the primary trace is running parallel to the calibration traces no correction is required, however when the spacing therebetween narrows, as shown in FIG. 10, this indicates that the primary trace is approaching slope reversal and will require correction. At the point of intersection between the primary trace and the secondary traces, as shown in FIG. 10, this slope reversal will actually occur.

If $\Delta H_x$ is equal to the incremental field along the $x$ or magnetometer axis created by calibration coil $CC_1$ and $\Delta H_y$ is the field created at a right angle to it by calibration coil $CC_2$ then $$\Delta H_1 = \Delta H_x \sin \beta$$
$$\Delta H_2 = \Delta H_y \cos \beta$$

where $\Delta H_1$ and $\Delta H_2$ equal the offsets on the chart of FIG. 10 of the calibration coil traces $CC_1$ anl $CC_2$ from the primary trace and where $\beta$ is the orientation of the magnetometer relative to magnetic north. If $\Delta H_1$ and $\Delta H_2$ have been carefully established, the azimuth of the magnetometer at the bottom of the ocean then becomes $$\beta = \tan^{-1} \frac{\Delta H_1}{\Delta H_2} \frac{\Delta H_y}{\Delta H_x} + 180°$$

There remains still, however, a 180° ambiguity due to the sign uncertainty of the response slope. This difficulty is easily overcome by attaching a compass to the magnetometer which may be set in place once the magnetometer reaches the ocean bottom. The compass will then establish the geographic direction of the calibration fields when the magnetometer is retrieved.

When known, the calibration fields also permits a valuable check on the stability of the instrument. It is easy to prove that the two offsets $\Delta H_1$ and $\Delta H_2$ must satisfy the condition $$\left(\frac{\Delta H_1}{\Delta H_x}\right)^2 + \left(\frac{\Delta H_2}{\Delta H_y}\right)^2 = 1$$

Figure 7:
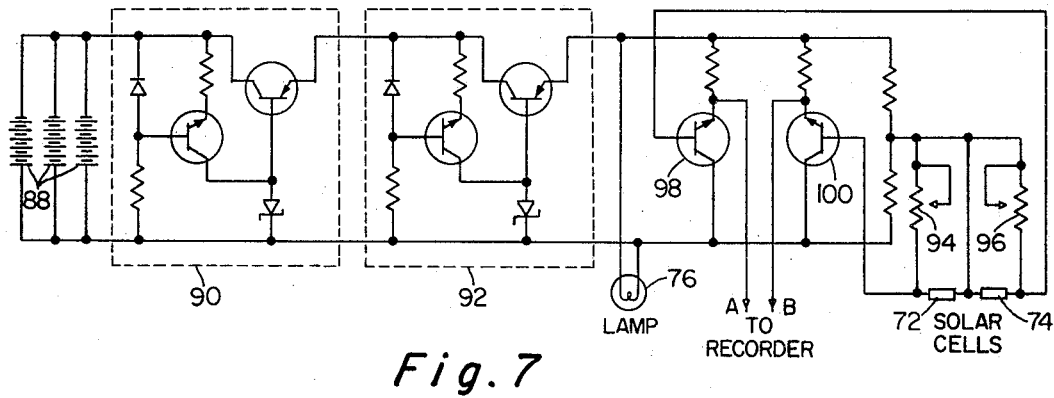
FIG. 7 is a schematic illustration of a portion of the circuitry for the present magnetometer.
Figure 8:
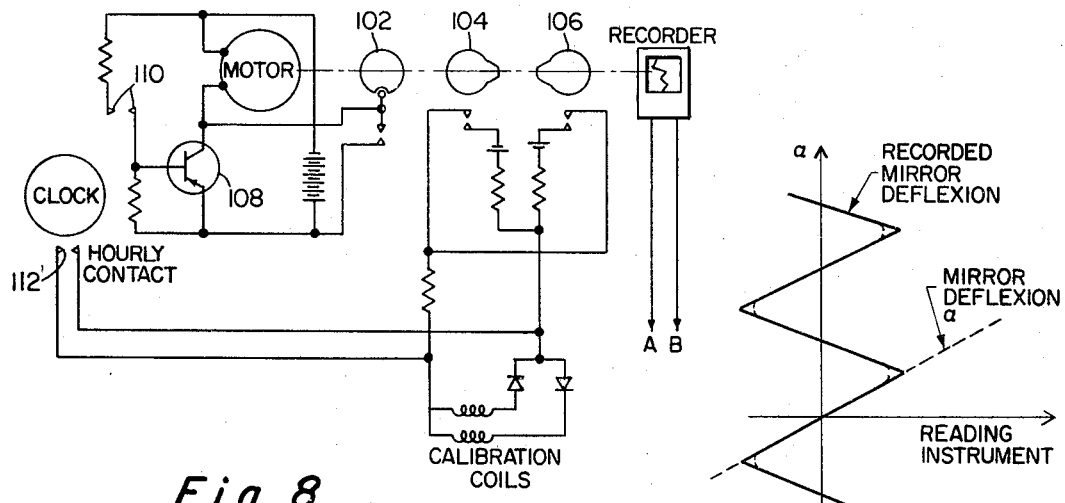
FIG. 8 is a schematic illustration of another portion of the circuitry for the magnetometer.

FIGS. 7 and 8 illustrate the circuitry which may be employed for operating the magnetometer and obtaining the primary and secondary traces shown in FIG. 10. The solar cells 72 and 74 may be powered by batteries 88. The power from the batteries 88 may in turn be regulated to the solar cells through voltage regulators 90 and 92. Further, a pair of potentiometers 94 and 96 may be utilized in the circuit between the regulator 92 and the solar cells 72 and 74 to adjust the load so that the voltage output of each solar cell is linearized with respect to the illumination received. A pair of transistors 98 and 100, serving the function of twin emitter followers, may be utilized between the load of the regulator 92 and the recorder for the purpose of matching the impedance therebetween.

It has been found satisfactory to employ a recorder which records every sixty seconds on an alternate basis the differential signal of the solar cells 72 and 74 and the signals of the calibration coils $CC_1$ and $CC_2$. Otherwise, the recorder may employ a needle which strikes the chart, shown in FIG. 10, every sixty seconds to impress a point forming either the primary or secondary traces. With the circuitry shown in FIG. 8 a four minute cycle may be obtained where at zero time the earth's magnetic fluctuation is recorded to place a point on the primary trace; at sixty seconds the calibration coil $CC_1$ is activated to impress a point on one of the secondary traces; at 120 seconds the earth's magnetic fluctuation is measured again to impress another point on the primary trace; and at 180 seconds the calibration coil $CC_2$ is activated to impress a point on the other secondary trace. Accordingly, the primary trace of the earth's magnetic fluctuation will be twice as dense as either of the secondary traces due to activation of the calibration coils. The circuitry of FIG. 8 may include a chart motor which is synchronized by signals from a clock to start the motor every four minutes. One revolution of the motor may take approximately 3.5 minutes. The timing sequence may be controlled by three cams 102, 104, and 106 which are mounted on the shaft of the motor of the recorder. The cam 102 may be utilized to interrupt the motor's rotation after each four minute recording cycle. The cycle is started again by a transistor switch 108 which in turn is activated by contacts 110 of the clock. The clock may be also utilized to short circuit the calibration coils through contacts 112 for a four minute interval every hour. These four minute intervals are shown in FIG. 10 in both the primary and secondary traces and will indicate hourly time intervals to an interpreter of the chart.

Obviously many modifications and variations of the present invention are possible in the light of the above teachings. It is therefore to be understood that within the scope of the appended claims the invention may be practiced otherwise than as specifically described.

I claim:
1. In a magnetometer:
    a mirror;
    means supporting the mirror for rotation about an axis;
    a magnet;
    means supporting the magnet for movement about and along the axis between connected and disconnected positions with respect to said mirror; and
    means for connecting the magnet to said mirror so that the mirror will rotate in response to rotations of the magnet about said axis.
2. A combination as claimed in claim 1 wherein the supporting means for the mirror and magnet includes:
    a taut wire;
    said mirror being mounted to said wire; and
    means mounting the magnet to the wire for movement along and about said wire.
3. A combination as claimed in claim 2 wherein the means for mounting the magnet to the wire includes a float.
4. A combination as claimed in claim 3 wherein the means for connecting the magnet to the mirror includes:
    a container;
    said float being located in said container;
    said magnet being mounted to the float; and
    means for filling the container with a liquid to buoy the float and connect the magnet to said mirror.
5. A combination as claimed in claim 4 including means for sensing the rotative movements of said mirror.
6. A combination as claimed in claim 5 wherein the sensing means includes:
    a pair of adjacent grids mounted on opposite sides of the optical axis of the mirror;
    one grid being an incident grid and the other grid being a reflected grid, and both grids having alternate transparent and opaque parallel bands which are offset with respect to one another;
    means for directing light through the incident grid to the mirror, thence to said reflected grid so that movements of the mirror impose the grid pattern of the incident grid at corresponding positions on the reflected grid; and
    means for sensing the light passed through the reflected grid.
7. A combination as claimed in claim 6 including a pair of calibration coils about said magnet with the wire of each coil being at 90° from the wires of the other coil.
8. A combination as claimed in claim 1 wherein the means for connecting the magnet to the mirror includes:
    a container;
    a float located in said container;
    said magnet being mounted to the float; and
    means for filling the container with a liquid to buoy the float and connect the magnet to said mirror.
9. A combination as claimed in claim 8 wherein the means for connecting the magnet to the mirror further includes:
    a taut wire; and
    said float being mounted for slidable movement along and about said wire.
10. A combination as claimed in claim 9 wherein:
    said container has an open top;
    said float has an upstanding portion which is movable along the wire in and out of the container through said open top;
    the top of the upstanding portion having a disc which is positioned substantially perpendicular to the wire; and
    another disc mounted to the bottom of the mirror and positioned substantially perpendicular to the wire, whereby said discs will engage one another to connect the magnet to the mirror when said container is sufficiently filled with said liquid.
11. A combination as claimed in claim 10 including means for sensing the rotative movements of said mirror.
12. A combination as claimed in claim 11 wherein the sensing means includes:
    a pair of adjacent grids mounted on opposite sides of the optical axis of the mirror;
    one grid being an incident grid and the other grid being a reflected grid, and both grids having alternate transparent and opaque parallel bands which are offset with respect to one another;
    means for directing light through the incident grid to the mirror, thence to said reflected grid so that movements of the mirror impose the grid pattern of the incident grid at corresponding positions on the reflected grid; and
    means for sensing the light passed through the reflected grid.
13. A combination as claimed in claim 12 including a pair of calibration coils about said magnet with the wire of each coil being at 90° from the wires of the other coil.

References Cited

UNITED STATES PATENTS

| 2,928,044 | 3/1960 | Schulze | 324—48 |
| 3,423,672 | 1/1969 | Stockton | 324—48 |

RUDOLPH V. ROLINEC, Primary Examiner

R. J. CORCORAN, Assistant Examiner

U.S. Cl. X.R.

33—223